United States Patent Office 3,636,211
Patented Jan. 18, 1972

3,636,211
METHOD FOR FINISHING SWINE FOR MARKET
Charles E. Jordan, Greenfield, Ind., assignor to Eli Lilly and Company, Indianapolis, Ind.
No Drawing. Continuation-in-part of application Ser. No. 480,131, Aug. 16, 1965. This application June 2, 1969, Ser. No. 829,782
Int. Cl. A61k 17/06
U.S. Cl. 424—240
4 Claims

ABSTRACT OF THE DISCLOSURE

Hogs are finished by the simultaneous oral administration of an estrogen and an androgen with improved feed efficiency and carcass quality.

CROSS-REFERENCE

This application is a continuation-in-part of my copending application, Ser. No. 480,131, filed Aug. 16, 1965, now abandoned.

BACKGROUND OF THE INVENTION

Ever since the discovery by Wise Burroughs (see U.S. Pat. 2,751,303) that diethylstilbestrol (to be referred to hereinafter as DES), when added to the diet of immature ruminants, improved both growth rate and feed efficiency, there have been many attempts to use DES as well as other hormones, both male and female, in finishing swine or other non-ruminant animals. In general, these attempts have led to failure, and there is considerable confusion in the art as to what precise effects are brought about by the administration of hormones to growing swine. For example, Pearson et al., J. Anim. Sci. 11, 251–260 (1952) found that implanting DES did not effect the rate of gain in gilts or barrows and depressed the rate of gain in boars. Dinusson, J. Anim. Sci. 10, 885–888 (1951) found that implantation of DES in swine did not stimulate gains, but did increase feed efficiency. Unfortunately, the amount of DES which had to be implanted in order to achieve this increased feed efficiency was so large that it produced a marked effect on the reproductive organs of gilts, a very serious and undesirable side effect. Baird et al., J. Anim. Sci. 18, 1495 (1959) concluded that implantation of estrogens or androgens in swine failed to improve average daily gain or feed efficiency and did not alter the carcass characteristics. Day et al., J. Anim. Sci. 19, 1898–1901 (1960) found that implantation of either DES or estradiol plus progesterone failed to increase average daily gain. Other workers have also concluded that implantation of DES actually decreased the average daily gain in barrows, showed no effect on the average daily gain in gilts, and that changes in secondary sexual characteristics and behavior in both barrows and gilts were found at levels below which any significant improvement in feed efficiency or carcass quality was found.

Administration of male sex hormones, whether by injection, implantation or by oral administration, likewise has not led to consistently improved performance in finishing swine. Woehling et al., J. Anim. Sci. 10, 889–892 (1951) found that implantation of testosterone in swine gave results which were indistinguishable from those obtained with control animals. Sleeth et al., J. Anim. Sci. 12, 322–330 (1953) found that injection of testosterone into swine did not affect feed performance, but did give rise to abnormal sexual behavior and signs of marked hormonal stimulation of the reproductive organs. Testosterone is not orally active, but methyl testosterone is; so feeding experiments, as opposed to implants, had to be carried out with methyl testosterone (to be referred to hereinafter as MT). Johnston et al., J. Anim. Sci. 16, 1024 (1957) found that MT, when fed alone at the rate of 9 or 15 mg. per pound of ration, decreased the average daily gain and feed efficiency of finishing swine, but improved carcass quality. On the other hand, Perry et al., J. Anim. Sci. 15, 1008–1013 (1956) found that feeding 27 mg. per day of MT per hog gave a depression in growth; feeding 17 mg. per day decreased the rate of gain; and feeding lower doses gave miniscule effects on some, but not all, carcass characteristics. Noland et al., J. Anim. Sci. 15, 1014–1019 (1956) fed MT at various levels and found that 0.15 mg. per kg. of body weight per day depressed the growth rate of female swine. Hale et al., Proc. Assoc. Southern Ag. Workers, 86 (1960) found that administration of 20 mg. of MT per day depressed the growth rate of barrows on a high energy diet, but not on a low energy diet. MT alone appeared to give some carcass improvement, particularly with regard to average backfat thickness, on a low protein diet, but the effect did not carry over to the high protein diet, nor was there any effect of either diet or area of loin eye muscle.

As noted above, some workers have employed combinations of hormones, particularly an estrogen and a progestational agent in finishing swine. Thrasher et al., J. Anim. Sci. 18, 399–409 (1959), however, carried out a rather complex experiment involving various male hormones and also combinations of male hormones with DES. In general, it can be said that Thrasher et al. found no statistically significant effects of the administration of MT or its analogues upon the growth rate or carcass quality of growing-finishing swine. They also concluded that various combinations of feeding and implanting DES and testosterone or MT had no statistically significant effect upon growth rate or live backfat depth of growing-finishing swine. As usual, they noted genital and/or mammary stimulation in DES-treated gilts and barrows, and this stimulation also occurred when MT and DES were fed simultaneously.

Finally, a British patent, B.P. 636,908, assigned to American Dairies discloses the feeding of mixtures of hormones, specifically the dimethyl ether of diethylstilbestrol and methyl testosterone, in Example V to fowls. The American Dairies patent advocates adding the hormones to the feed in the following ranges: from 50–400 mg. of the dimethyl ether of DES per kg. of feed and from 5–20 mg. of MT per kg. of feed. Since the dimethyl ether of DES is about four times as effective as DES itself, the amount of hormone used in terms of DES equivalent is 100–800 mg. per kg. of feed. Thus, the ratio of female to male hormones in terms of a DES/MT equivalent ratio varies from 5 to 1 up to 160 to 1, and the daily amounts of hormone ingested by a hog eating an average of 5–6 lbs. (2.28–2.72 kgs.) of feed per day varies from 228–2176 mgs. DES and from 11.4–54.4 mgs. MT. Dosages of both hormones are high enough individually to cause serious side effects, particularly endocrine disturbances. In fact, hogs fed the exact amounts of hormones advocated by the American Dairies patent will show a most undesirable degree of feminization without improvement in carcass quality or feed efficiency.

It can be concluded from the prior art briefly reviewed above that no unequivocal results have been obtained by workers as regards stimulation of growth, increased feed efficiency, or over-all carcass quality in immature swine when various hormonal agents have been administered to these swine singly or in combination in the amounts specified. Furthermore, it should be noted that very little work has been published in this field since 1960.

It is an object of this invention to provide a method for feeding immature swine which yields both improved feed efficiency and improved carcass quality by administrating to said swine a combination of hormones in fixed ratios and amounts. Other objects of this invention will become apparent from the description which follows.

SUMMARY OF THE INVENTION

In fulfillment of the above and other objects, this invention provides a method of finishing immature swine for market so as to improve both feed efficiency and carcass quality which comprises administering from about 4 to about 24 mg. of DES per hog per day and from about 2 to about 24 mg. of MT per hog per day with the proviso that the ratio of MT to DES be at least 1:2 and not greater than 4:1.

This novel process is conveniently carried out as follows: DES and MT are mixed in a complete ration at the rate of about 1.6 g. to about 8 g. of DES per ton of complete ration and from about 0.8 to about 8 g. of MT per ton of complete ration. The swine to be finished are then fed this ration ad libitum. The average consumption of a complete feed is in the range of about 5 to 6 pounds per hog per day. Alternatively, the above hormones can be administered in a feed supplement containing, for example, from about 4 to about 24 mg. of DES per pound of supplement and from 2 to about 24 mg. of MT per pound of supplement where about one pound of supplement is fed per hog per day in addition to grain or other normal feedstuffs.

In the above description, although DES and MT were specified, it will also be understood by those skilled in the art that an equivalent amount of any other orally active estrogenic agent can be used in place of DES. By "equivalent amount" is meant that quantity of an estrogen which would have the same estrogenic effect, or gonadotrophin-inhibiting effect, as a stated quantity of DES. Similarly, other agents having male hormonal activity can be used in place of MT, the quantity administered being dependent on the relative activity as an androgen and/or anabolic agent of the other compound as compared to MT.

In describing a general method of carrying out our novel swine finishing process, certain ranges have been specified for the amount of DES and MT to be administered per hog per day. Within these ranges, however, it is necessary that the amount of MT in milligrams always be at least one-half the amount of DES in milligrams in order to avoid external evidence of estrogenic stimulation as is apparent when the amount of DES or its equivalent fed is greater than twice the amount of MT or its equivalent.

The effects of a swine finishing program coming within the scope of my invention can be best visualized by reference to actual experimental results.

TRIAL I

A group of 78 barrows weighing about 110 pounds each were given a basal ration which contained 1 mg. each of DES and MT per pound of ration and were maintained on this feed for an average of 63.5 days at which time their average weight was about 220 pounds. The average food intake was about 5.3 pounds and the average intake of hormones was, therefore, about 5.3 mg. each of DES and of MT. Table I which follows gives the results obtained in this experiment compared with the feed data etc. obtained from a group of barrows receiving only the basal ration.

TABLE I

|  | Basal | DES plus MT |
|---|---|---|
| Avg. daily gain, lbs | 1.79 | 1.64 |
| Days on feed | 58.7 | 63.5 |
| Avg. daily feed, lbs | 6.19 | 5.31 |
| Feed/gain | 3.46 | *3.26 |
| Feed/gain | 3.46 |  |

*$P<.01$.

It can be seen from Table I above that barrows fed a complete ration containing added hormones gained weight more slowly than those on the basal ration, and it was thus necessary to keep them on feed for a slightly longer time. However, they also consumed less feed per day, and the feed efficiency—the ratio of the pounds of feed per pound of gain—was much more favorable for swine receiving the ration with added hormones. In fact, the difference between the feed efficiency for the swine receiving the treated and those receiving the untreated rations was statistically significant at a confidence level of $P<.01$.

TRIAL II

Each member of a group of 76 gilts weighing initially about 106 pounds each were fed the same basal ration as in Trial I containing in addition about 1 mg. of DES and 1 mg. of MT per pound of ration. They were fed this ration until they attained a final weight of 220 pounds. The results of this feeding experiment are given in Table II below.

TABLE II

|  | Basal | DES plus MT |
|---|---|---|
| Avg. daily gain, lbs | 1.58 | 1.61 |
| Days on feed | 65.7 | 64.5 |
| Avg. daily feed, lbs | 5.34 | 5.18 |
| Feed/gain | 3.38 | *3.24 |

*$P<.05$.

In this trial, there was no statistically significant difference between rate of gain for the treated and untreated gilts, in contrast to the results obtained in Trial I for barrows. However, the same increased feed efficiency was found as with the barrows, and the difference in feed efficiency between the treated and untreated gilts was statistically significant at a level $P<.05$.

Table III below gives the average of the findings in Trials I and II for both barrows and gilts.

TABLE III

|  | Basal | DES plus MT |
|---|---|---|
| Avg. daily gain, lbs | 1.69 | 1.62 |
| Days on feed | 62.2 | 64.0 |
| Avg. daily feed, lbs | 5.78 | 5.27 |
| Feed/gain | 3.42 | *3.25 |

*$P<.01$.

It will be seen from the data in Table III that, considering the barrows and gilts as a group, even though average daily gains were reduced, the feed efficiency was again statistically significantly improved at a confidence level of $P<.01$.

In addition to an improved feed efficiency, the process of this invention also yields an improved carcass quality as evidenced by greater proportion of lean meat in relation to fat. Table IV below gives a comparison of carcass quality for a group of 118 barrows and gilts maintained upon a basal ration and a group of 119 barrows and gilts maintained on a basal ration plus 1 mg. per pound each of DES and MT.

TABLE IV

|  | Basal | DES plus MT |
|---|---|---|
| No. animals | 118 | 119 |
| Avg. farm wt., lbs | 220.68 | 220.46 |
| Avg. chilled carcass wt, lbs | 162.70 | 161.60 |
| Dressing, percent | 73.7 | 73.3 |
| Avg. carcass length, cm | 79.1 | ¹ 79.7 |
| Avg. backfat, mm | 36.1 | ² 32.8 |
| Loin eye, sq. cm | 30.8 | ² 33.2 |
| Lean cuts, lbs | 88.3 | 91.1 |
| Lean cut yield ³ percent | 54.3 | ² 56.4 |
| Lean cut yield ⁴ percent | 40.0 | ² 41.4 |
| Fat trim and leaf fat, lbs | 32.9 | 28.8 |
| Fat yield ³ percent | 20.2 | ² 17.8 |

¹ $P<.05$.
² $P<.01$.
³ Vs. chilled carcass weight.
⁴ Vs. live farm weight.

According to the above table, there were no statistically significant differences between the average farm weights, the chilled carcass weights and the dressing percent between the treated and untreated groups. The treated animals, however, had a greater carcass length (a most desirable attribute and statistically significantly less backfat, greater loin eye, greater percent of lean cuts (compared to either chilled carcass weight or live farm weight) and a lower fat yield. These findings are indicative of the improved carcass quality attainable by use of my novel feeding procedure.

In summary, it can be seen from the results in Tables I–IV that both barrows and gilts have a greatly increased feed efficiency when their ration contains the quantities of DES and MT specified above. Barrows alone do not gain quite as rapidly as gilts, but this difference amounts to only a few days extra finishing time. In addition, there is improved carcass quality, in several aspects by which such quality is judged, for animals fed a basal ration containing DES and MT compared to those given a basal ration alone.

Different levels of DES and MT give essentially the same results as those recorded above in Tables I–IV. Table V below gives the results of feeding various combinations of DES and MT to groups of 19–21 hogs upon the average backfat and the average lean cuts, both criteria of carcass quality.

TABLE V

| Level mg./lb. of ration DES—MT | No. animals | Avg. backfat, in. | Avg. lean cut yield [1] |
|---|---|---|---|
| 0—0 | 20 | 1.270 | 56.72 |
| 1+1 | 20 | 1.215 | 57.72 |
| 1+2 | 21 | [2] 1.123 | [2] 59.03 |
| 1+4 | 21 | [2] 1.153 | [2] 58.54 |
| 2+1 | 21 | 1.155 | 57.91 |
| 2+2 | 20 | 1.200 | [2] 58.52 |
| 2+4 | 21 | [2] 1.165 | [2] 58.52 |
| 4+4 | 19 | [1] 1.152 | [2] 58.50 |

[1] As a percent of the chilled carcass weight.
[2] P<.05.

As will be seen from Table V, all swine fed the various ratios of DES and MT yielded an improved carcass compared with those fed a control ration.

In another trial, the effect of combinations of DES and MT in a complete ration for finishing swine was compared with the use of DES and MT alone. Table VI which follows compares the data obtained for two combinations of DES and MT, for DES alone, and for MT alone at the same level, as regards feed efficiency, average backfat, and average percent of lean cuts.

TABLE VI

Comparison of DES and MT, alone and in combination, in finishing rations for swine

| Level mg./lb. DES—MT | No. animals | Feed/lb. gain, lbs. | Avg. backfat, in. | Avg. lean cut yield [1] |
|---|---|---|---|---|
| 0+0 | 28 | 3.31 | [2] 1.25 | [2] 54.3 |
| 1+1 | 28 | 3.13 | [2] 1.15 | [2] 55.7 |
| 1+½ | 28 | 3.18 | [2] 1.17 | [2] 55.7 |
| 1+0 | 12 | 3.27 | 1.19 | 55.4 |
| 0+1 | 10 | 3.41 | 1.20 | 54.6 |

[1] As a percent of the chilled carcass weight.
[2] Data from 19 carcasses.

According to the data in Table VI above, the combination of DES and MT invariably gave better feed efficiency and more desirable carcass characteristics than either hormone by itself when the hormones were fed at substantially the same levels.

The above data was more fully corroborated by a series of field trials carried out in different geographical areas. A total of 619 barrows and gilts were fed a complete ration containing 2 g. each of MT and DES per ton or 1 mg. each per lb. The gain in feed efficiency for the group was 6.2 percent over the control group; the increase in yield of lean cuts 2.8 percent over the control group and the decrease in backfat thickness 7.4 percent less than the control group.

In the above experiments, the hormones are added to a complete swine ration in an amount varying from 1 to 8 grams per ton of complete ration. A typical complete grower ration has the following ingredients.

SWINE GROWER RATION

| Ingredient: | Lbs./ton |
|---|---|
| Corn, yellow, ground | 1464 |
| Alfalfa meal, dehydrated, 17% | 50 |
| Soybean oil meal, solvent extracted dehulled, 50% | 246 |
| Meat scraps, 55% | 50 |
| Fish meal with solubles | 50 |
| Distillers dried solubles (corn) | 50 |
| Animal fat | 40 |
| Calcium carbonate | 14 |
| Dicalcium phosphate, feed grade | 10 |
| Salt (NaCl) | 10 |
| Trace mineral premix, AN-03 [1] | 2 |
| Swine vitamin premix, SW-03 [2] | 10 |
| Methionine hydroxy analogue, 90% | 4 |
| Total | 2000 |

[1] Each kg. of premix contains the following: 50 gm. of manganese sulfate, 100 gm. of zinc as zinc carbonate, 50 gm. of iron as ferrous sulfate, 5 gm. of copper as copper oxide, 1.5 gm. iodine as potassium iodide, and 150 gm. maximum and 130 gm. minimum calcium as calcum carbonate.
[2] Each kg. of premix contains the following: 77,161 USP units vitamin D₂; 440.0 mg. riboflavin; 2,240.6 mg. niacin; 1,602.4 mg. pantothenic acid; 19,180 mg. chlorine; 4.4 mg. vitamin B₁₂; 2000 mg. methyl testosterone, and 2000 mg. diethylstilbestrol.

A typical swine finisher ration with added hormones contains the following ingredients.

SWINE FINISHER

| Ingredient | Percent | Lbs./ton |
|---|---|---|
| Corn, yellow, ground | 78.25 | 1,565 |
| Alfalfa meal, dehydrated, 17% | 2.50 | 50 |
| Soybean oil meal, solvent extracted, dehulled, 50% | 10.50 | 210 |
| Meat scraps, 55% | 2.50 | 50 |
| Distillers dried solubles (corn) | 2.50 | 50 |
| Animal fat | 2.00 | 40 |
| Dicalcium phosphate, feed grade | 0.50 | 10 |
| Calcium carbonate | 0.40 | 8 |
| Salt (NaCl) | 0.50 | 10 |
| Trace mineral premix, AN-03 [1] | 0.10 | 2 |
| Swine vitamin premix, SW-03 [2] | 0.25 | 5 |
| Total | 100.00 | 2,000 |

[1] Each kilogram of premix contains the following: 50 gm. of manganese as manganese sulfate, 100 gm. of zinc as zinc carbonate, 50 gm. of iron as ferrous sulfate, 5 gm. of copper as copper oxide, 1.5 gm. iodine as potassium iodide, and 150 gm. maximum and 130 gm. minimum calcium as calcium carbonate.
[2] Each kilogram of premix contains the following: 77,161 USP units vitamin D₂; 440.0 mg. riboflavin; 2,240.6 mg. niacin; 1,602.4 mg. pantothenic acid; 19,180 mg. chlorine; 4.4 mg. vitamin B₁₂; 2,000 mgs. MT and 2,000 mgs. DES.

A supplement useful in the processes of this invention would contain all the ingredients in the above rations except corn. In the above feeds, the male hormone can be present in an amount varying from 0.8 to 8 g. per ton in terms of MT equivalent and from 1.6 to 8 g. per ton in terms of DES equivalent. In terms of pounds, the amount of MT equivalent is 0.4 to 4 mg./lb. and the amount of DES equivalent 0.8 to 4 mg./lb. Thus a hog eating from 5–6 lbs. of a complete feed per day would ingest, on the average, from about 4 to about 24 mg. of DES equivalent per day and from about 2 to about 24 mg. of MT equivalent per day. Preferably, both DES and MT are present in the complete ration at a level of about 1 mg./lb. or 2 g./ton.

I claim:

1. A method for finishing immature swine for market so as to improve feed efficiency and carcass quality which comprises orally administering daily to each member of a group of said swine from about 4 to about 24 mg. of diethylstilbestrol and from about 2 to about 24 mg. of methyl testosterone, said amount of diethylstilbestrol and methyl testosterone being in a ratio of from 2:1 to 1:4.

2. The process of claim 1 wherein the diethylstilbestrol and methyl testosterone are administered in a feed.

3. A method according to claim 1 in which the diethylstilbestrol and methyl testosterone are orally administered in a complete ration, the diethylstilbestrol being present in an amount of from about 1.6 to about 8 grams per ton of complete ration and the methyl testosterone being present in an amount of from about 9.8 to about 8 grams of methyl testosterone per ton of complete ration.

4. A method for finishing immature swine for market so as to improve feed efficiency and carcass quality which comprises feeding to each member of a group of said swine about 6 mg. per day of diethylstilbestrol and 6 mg. per day of methyl testosterone.

References Cited

FOREIGN PATENTS 636,908  5/1950  Great Britain _____ 99—2

SAM ROSEN, Primary Examiner